Patented June 27, 1944

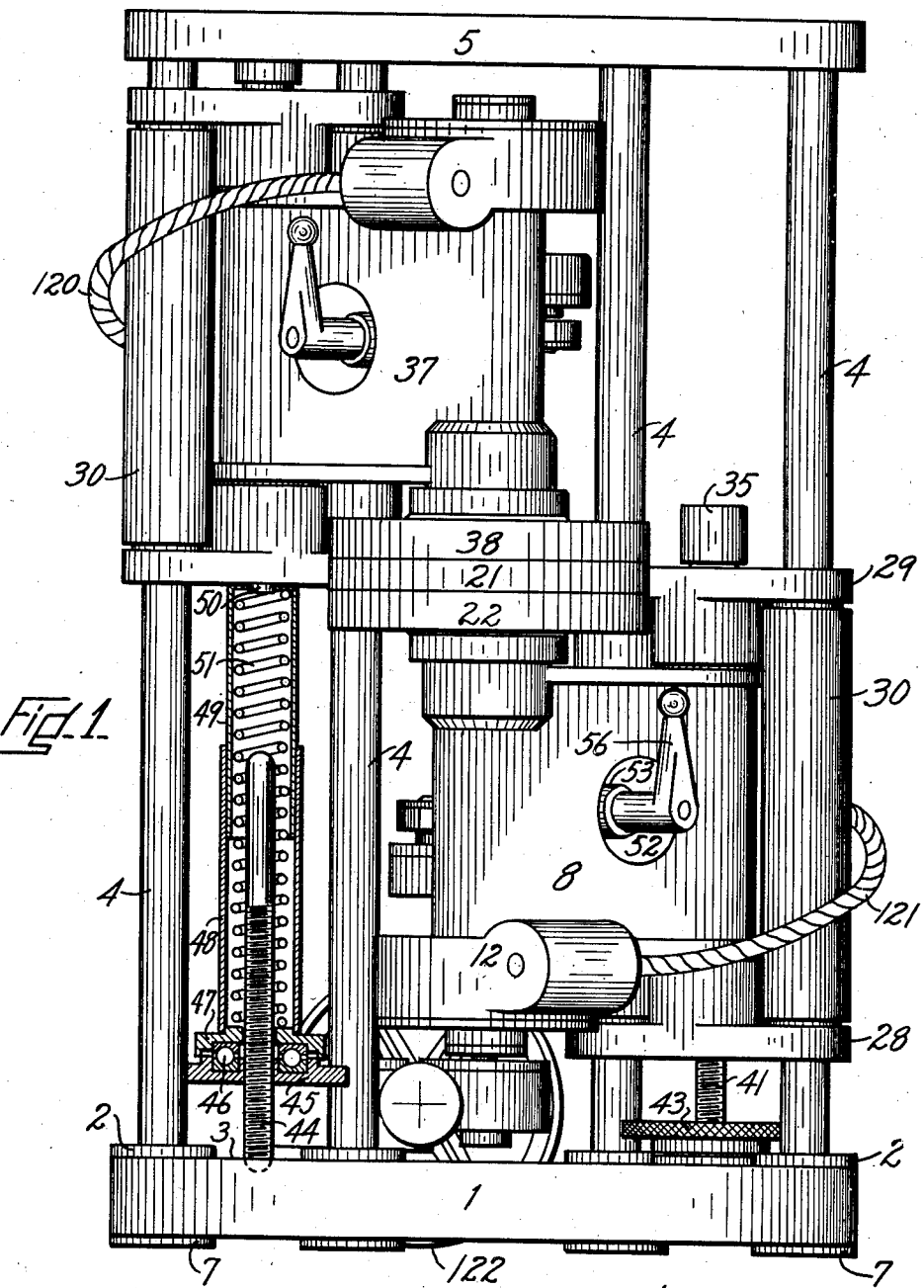

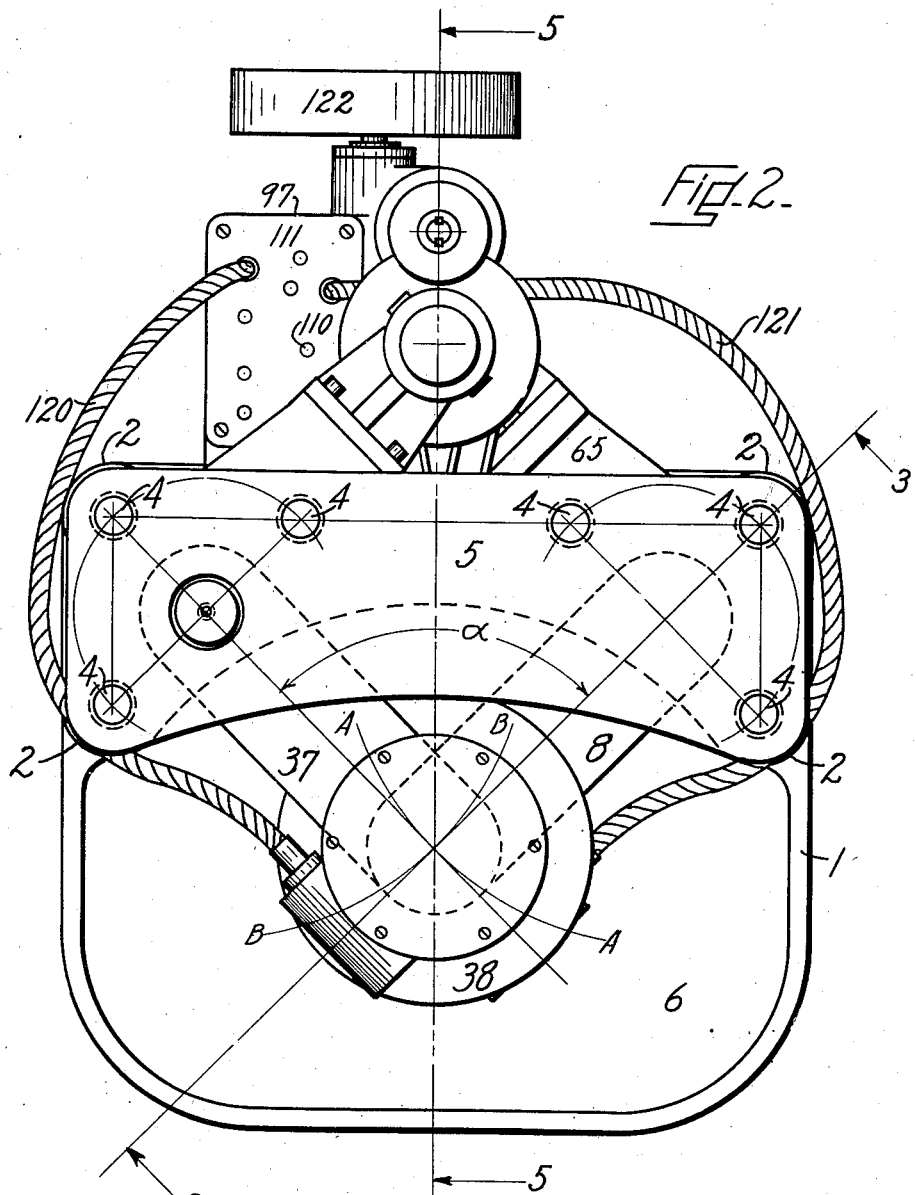

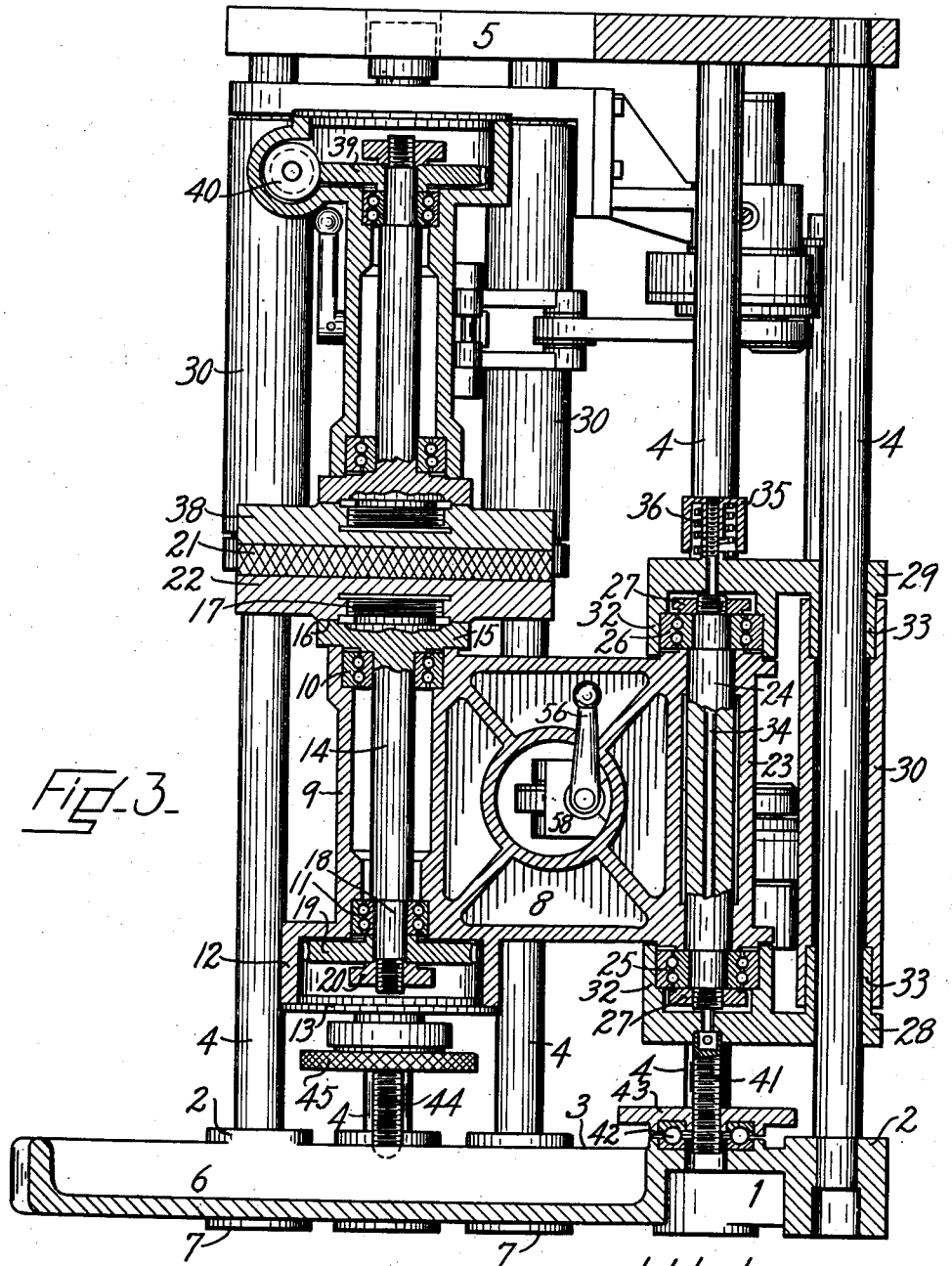

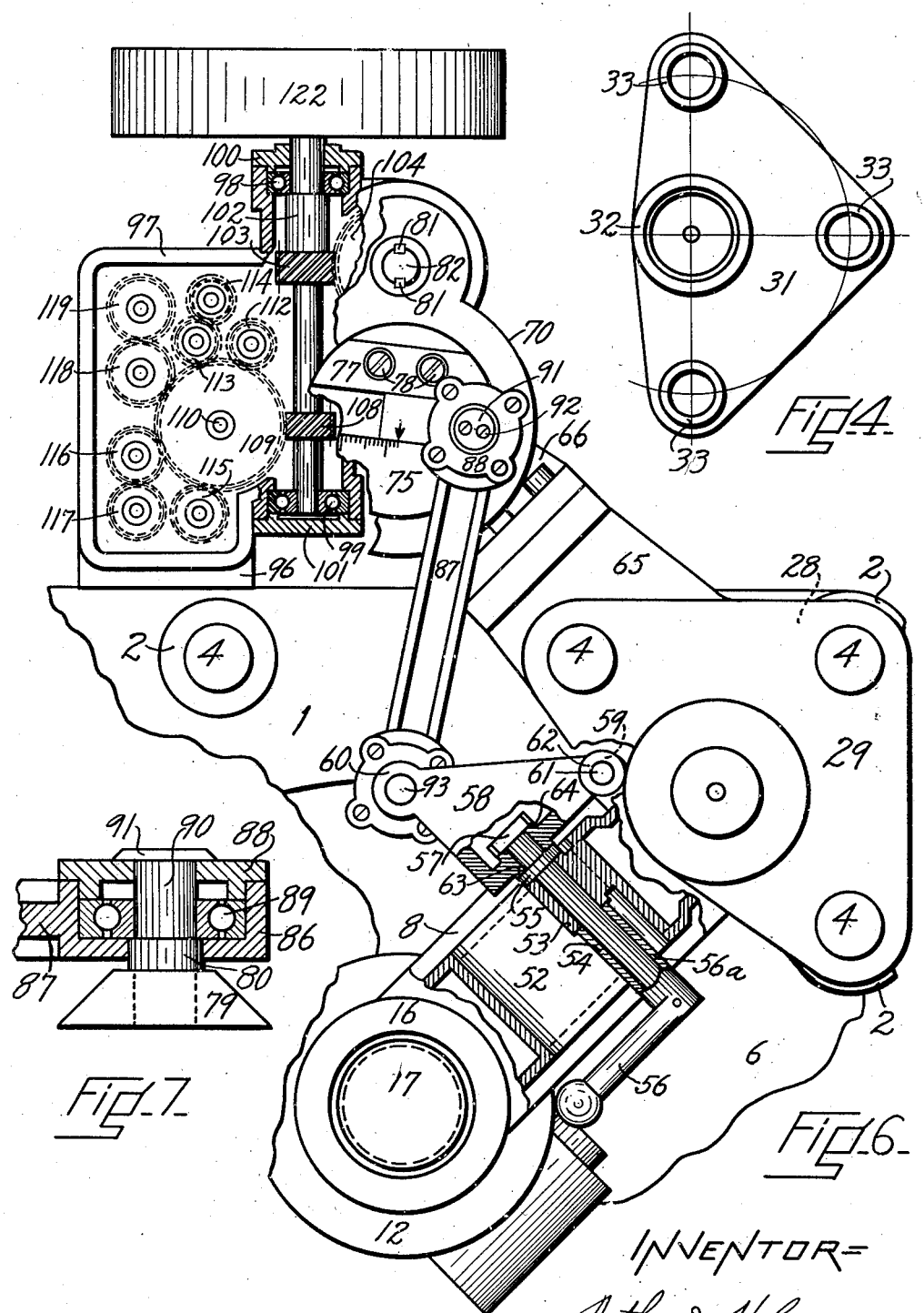

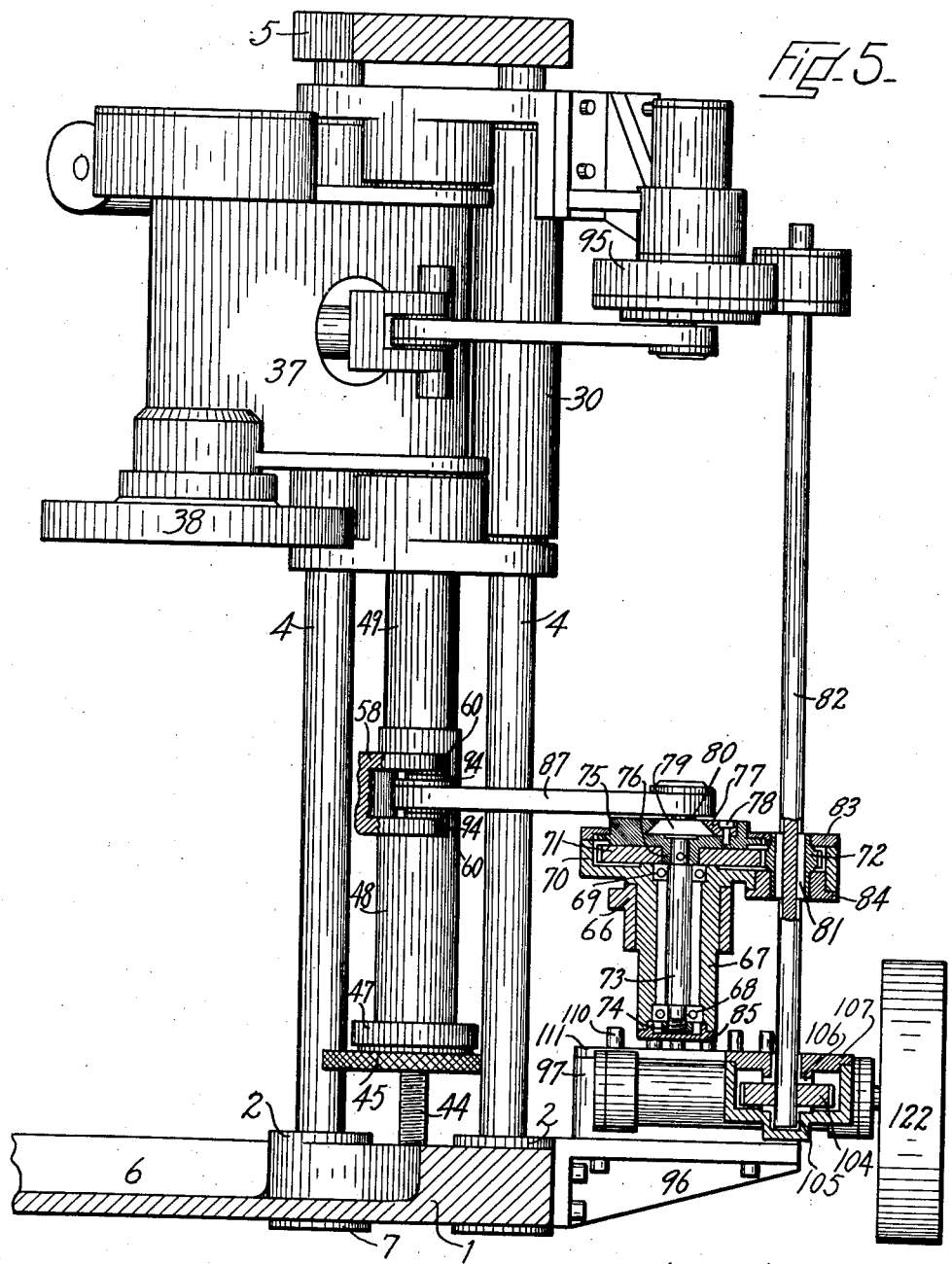

2,352,386

UNITED STATES PATENT OFFICE 2,352,386

OPTICAL FLAT GENERATOR

Arthur J. Holman, Brighton, N. Y., assignor to Bausch & Lomb Optical Company, Rochester, N. Y., a corporation of New York Application June 29, 1942, Serial No. 449,010

22 Claims. (Cl. 51—55)

My invention relates to apparatus for generating optical surfaces, and it has been the special object of this invention to create a mechanism which will grind and polish precision optical flats. In apparatus for generating surfaces the work and tool are both constrained in their movements in such manner that the mechanism, if operated for a sufficiently long period of time, will create automatically both on the abrading surface of the tool and on the work the kind of precision surface the mechanism is designed to produce, whether it be a spherical or cylindrical or flat optical surface. My former invention disclosed in Letters Patent of the United States—No. 1,827,748, dated October 20, 1931, is an example of a mechanism for generating precision spherical surfaces, and in this device both the work and tool are so constrained as to have freedom of movement only about the center of curvature of the surface being generated. This is the fundamental requirement for generating precision spherical surfaces.

In designing a mechanism suitable for generating optical flats which, mathematically, are spheres of infinite radius, it becomes necessary to create a structure which will constrain the movements of the abrading parts to motion about a center at infinity, i. e., the abrading surfaces must move only in parallel planes. Theoretically, two abrading surfaces in contact might be supported on separate sliding carriages arranged to move in parallel planes at an angle to each other and at different frequencies to vary the pattern of motion. At the present time, however, the mechanical arts have not thus far produced sliding motion of sufficient accuracy to meet the requirements for generating precision optical flats. Moreover, if such precise sliding mechanism were available, it is difficult to conceive how it would be protected properly against rapid deterioration due to entrance of the abrading materials used in grinding and polishing the optical surfaces.

The mechanism hereinafter disclosed employs swinging movement around parallel axes as the primary means for securing movement of the work and tool in parallel planes. The fundamental motion is thus reduced to hinge action which permits the use of one of the most highly developed and most accurate products of the mechanical industries, namely the precision ball bearing. In the present device, the abrading parts are supported from ball bearings and all movements, including oscillation and rotation of these parts, take place about the axes of pairs of precision ball bearings which are pre-loaded to the degree necessary to secure the best performance from these ball bearings. It is a simple matter to seal these bearings against entrance of abrading materials hence the accuracy of the hinge action and of the rotation employed in the present device for generating optical flats, need not be impaired even after long periods of operation of the device.

The present structures are simple, effective, easily operated by relatively unskilled workers, not too expensive to construct, economical to maintain at top efficiency, and they will produce precision optical flats more rapidly and at lower cost than the mechanisms and devices now currently used.

My device may be best understood by reference to the drawings in which

Fig. 1 is a front view of my device with the tool pressure control mechanism shown in cross section.

Fig. 2 is a top view.

Fig. 3 is a section on line 3—3 of Fig. 2.

Fig. 4 is a view of an end member of a hinge pin supporting carriage.

Fig. 5 is a partial section on line 5—5 of Fig. 2 showing crank operating mechanism.

Fig. 6 is a top view, partly in cross section, showing main gear box with cover removed and driving mechanism for one oscillating arm member.

Fig. 7 is a section through one end of a connecting rod.

Referring now more specifically to the drawings in which like reference numerals indicate like parts, 1 (Figs. 1, 2 and 3) is a cast metal base having six bosses 2 on its upper surface 3, which are accurately finished so their top faces lie in one plane. Each of the bosses 2 contains a bore of exactly the same diameter and all these bores are arranged so their axes are parallel and at right angles to the machined faces of bosses 2, moreover these bores are exactly spaced each from the other according to a geometrical pattern (Fig. 2). Frame studs 4, of which there are six, finished to the exact same size, straight and highly polished, have their end portions finished to a smaller diameter to press fit into the bores in bosses 2. Frame studs 4, when press fitted into base 1, should stand parallel throughout their entire length. A top frame number 5, containing bores exactly matching those in the base 1 with respect to size, spacing and orientation, is press fitted on the upper ends of frame studs 4 after the adjustable carriages hereinafter described have been mounted on the frame studs. The base 1, parallel frame studs 4 and top frame member 5 constitute the entire frame structure of my device whereon the oscillating arm members and mechanism for oscillating them, also mechanism for rotating the work and tool spindles, are supported.

Within the base 1 is formed a catch basin 6 (Figs. 2 and 3) which serves to collect any abrading materials dropping from the edge of the tool or work as the machine is operated. Bosses 7 projecting from the lower surface of the base are machined parallel to the faces of bosses 2 so the mechanism will stand vertical on a level work bench.

The lower oscillating arm member 8 consists essentially of a cylindrical structure for housing and suitably supporting for rotation the work spindle, a cylindrical structure for supporting the hinge pin whereon the arm member 8 oscillates, and an integral box frame structure joining the two cylindrical structures in such manner as to maintain exact parallelism between the axes of the cylindrical structures when the parts are subjected to the stresses created by normal operation of the mechanism. Cylindrical housing 9 (Fig. 3) is bored at its upper end to receive ball bearing 10 with a light press fit. In a bore of somewhat smaller diameter in the opposite end of housing 9 is lightly press fitted ball bearing 11 which is exactly aligned with ball bearing 10. The lower end of cylindrical housing 9 is enlarged to form the gear box 12 which is closed at the bottom by gear box cover 13, the latter being held in position by suitable screws (not shown).

The work spindle 14 has integral flanged head 15 of large diameter which is provided with special means for insuring exact positioning of the work supporting chuck as more fully described in copending patent application Serial No. 422,671 filed December 12, 1941. This means consists essentially of a highly polished flat annular surface 16 lying exactly at right angles to the axis of work spindle 14, and an accurately threaded portion 17 of large diameter projecting beyond surface 16 and adapted to center the chuck accurately on the work spindle and draw it down square to annular contact surface 16 when the chuck is screwed into operating position on the spindle. Work spindle 14 is a light press fit in the inner race of ball bearing 10, and a bearing surface on flanged head 15 contacts the upper end of the inner race, all other parts of head 15 being machined to clear ball bearing 10 and the upper end of cylindrical housing 9. Lower portion 18 of work spindle 14 is a light press fit in the inner race of ball bearing 11 and projects through the bore in worm gear 19 with very slight clearance, the projecting portion beyond gear 19 being threaded and provided with flanged nut 20. Gear 19 is keyed to end portion 18 of spindle 14 to prevent it from turning on the spindle.

The structures just described for rotatably supporting work spindle 14 are arranged with sufficient clearance between the upper end of the inner race of ball bearing 11 and the shoulder on spindle 14 so that tightening flanged nut 20 not only retains worm gear 19 upon the spindle, but also provides any desired amount of preloading on ball bearings 10 and 11. The force exerted by tightening flanged nut 20 is transmitted through the structures as follows: through spindle 14 to flanged head 15, flanged head 15 to inner race of bearing 10, diagonally through the balls to the outer race, from outer race of bearing 10 to housing 9, thence to outer race of bearing 11, diagonally through the balls to the inner race, and thence back through gear 19 to flanged nut 20.

The work 21, whereon the flat surface is to be generated, is mounted in any suitable manner on the chuck 22 which is a flat circular well seasoned metallic plate of sufficient thickness to prevent warping under normal conditions of use. Projecting from the lower face of chuck 22 is a highly polished flat annular surface matching in size, shape and flatness the annular surface 16 on flanged head 15 of the work spindle 14. A centrally positioned recess within the body of chuck 22 is threaded square to the annular flat surface above mentioned, the thread being a precision fit on the threaded projecting portion 17 of work spindle 14. The ability to transfer successfully chucks and the work mounted thereon from one machine to another for progressive grinding and polishing is determined largely by the accuracy of thread in thread and annular surface on surface fit and by the cleanliness exercised by the operator when attaching chuck 22 to work spindle head 15.

As previously stated, cylindrical housing 9 (Fig. 3), wherein the work spindle is rotatably mounted, is connected by a suitable box frame structure with cylindrical housing 23, which is provided with aligned bores in its opposite ends, the common axis of these bores being exactly parallel to the axis of the work spindle 14. Hinge pin 24 is a good press fit in each of these bores and the length of hinge pin 24, measured between the shoulders against which ball bearings 25 and 26 abut, is slightly greater than the over all length of cylindrical housing 23. The inner races of bearings 25 and 26 are a light press fit on the seats provided for them on hinge pin 24 and the ends of the hinge pin projecting through the bearings are threaded and provided with suitable lock nuts 27 to retain the bearings in operating position on the hinge pin.

Hinge pin 24 and its supporting ball bearings 25 and 26 are provided with vertical adjustment means in the following manner: A carriage comprising end members 28 and 29 (Fig. 3) and three spacer sleeves 30 is arranged to slide with minimum clearance on three frame studs 4. The end members 28 and 29, made of suitable antifriction material for free sliding on polished steel frame studs 4, are each provided with a plate section 31 (Fig. 4) from which project a central boss 32 and three identical surrounding bosses 33, the former being bored for a light press fit on the outer race of ball bearing 25 (or 26) and the latter being bored for a snug sliding fit on frame studs 4, the bores in bosses 33 being parallel, equidistant from each other and spaced equally from the axis of the bore in boss 32, all according to the geometrical pattern shown in Figs. 2 and 4. The bosses 32 and 33 on each end member 28 and 29 (Fig. 3) are finished to identical heights and bosses 33 are also finished externally to a good press fit in recesses in sleeves 30, the measurement on each sleeve 30, between the shoulders against which the ends of bosses 33 abut when finally pressed home, being identical. Passing through a bore in hinge pin 24 extending throughout the length of the hinge pin and through bores in end members 28 and 29 is bearing preloading rod 34 which is suitably anchored at its lower end and carries on its upper threaded end a threaded hollow nut 35 (Fig. 3) within which is a calibrated spring 36, the purpose of which is to provide a predetermined tension on preloading rod 34, It is to be noted that the three bores which slide on the three frame studs 4 and the central bore which seats the hinge pin ball bearing are all made in the end members 28 and 29 and, furthermore these end members are made of antifriction material suitable for sliding on polished steel. The success of the present device in generating optical flats depends in large measure on the accuracy of its construction, hence every means must be employed to eliminate accumulated inaccuracies. If, for example, end members 28 and 29 were not made of antifriction material, it would be necessary to insert antifriction bushings in the three bores surrounding the frame studs. Any eccentricity whatsoever in these bushings, and there always is some because no mechanical product is ever perfect, would introduce greater errors between the hinge pin axis and the three frame studs whereon the carriage slides. By making the four bores directly in the end members at one setting on a Swiss jig borer, cumulative errors between the axis of the hinge pin and the axes of parallel frame studs 4 are reduced to the minimum.

The preloading of ball bearings 25 and 26, provided by tensioning preloading rod 34 as previously described, is obtained by transmission of pressure between end members 28 and 29 as follows: from end member 28 to outer race of ball bearing 25, thence diagonally through the balls to the inner race, thence to hinge pin 24, thence to inner race of ball bearing 26, thence diagonally through the balls to the outer race and, finally, back to end member 29. The goal aimed at in this construction is to so proportion the parts that end members 28 and 29 will always remain parallel and when ends of bosses 33 have seated against shoulders in sleeves 30 and preloading rod 34 has been tensioned to the desired amount the bearings 25 and 26 will have just become seated against the shoulders at the bottom of bosses 32, i. e., when the carriage structure is completely assembled and bearings 25 and 26 are properly preloaded the end members 28 and 29 will be exactly parallel, and hence these members will slide freely, with minimum clearance, on frame studs 4.

Oscillating arm member 37 (Fig. 1) is a duplicate of oscillating arm member 8, carries the same kind of rotating spindle and the same kind of hinge pin, but it is mounted in an inverted position on the upper portions of the second group of three frame studs 4, located on the left side of the frame structure. This oscillating arm member 37 carries the tool 38 which is mounted on the tool spindle head in just the same manner as chuck 22 is mounted on the work spindle head 15. The tool spindle is power driven through the worm gear 39 (Fig. 3) similar to worm gear 19 mounted on the work spindle, and is rotated by the worm 40. Worm gear 19 on the work spindle is driven by a worm exactly like worm 40.

While many optical flats are required on parallel faces of relatively thin plates, it is advisable in constructing a flat generating machine to provide adjustability of the oscillating arm members of sufficient magnitude to accommodate prism blanks which may be quite thick, perhaps two or three inches in thickness. The work 21, shown in the drawings, is relatively thin and to accommodate thicker work and whatever mounting means are required to hold the work on the chuck, I have provided leeway in the frame structure and adjustability of chuck elevation in the following manner: Attached to the lower adjustable (work supporting) carriage (Figs. 1 and 3) by any suitable means, such as by pinning to the head of preloading rod 34, is lifting screw 41 which projects through a clearance hole in the top of base 1. A seat formed in the upper face 3 of the base 1 contains the lower race of thrust bearing 42, the upper race and ball container of which are nested in the adjusting hand wheel 43, the hub of which is tapped to fit on lifting screw 41. By simply turning the adjusting hand wheel 43, the adjustable carriage and the work spindle supporting structures carried thereon may be variously positioned up and down along frame studs 4 to accommodate whatever thickness of work is to be surfaced.

The tool 38 and the structures controlling and limiting its movements, including upper oscillating arm member 37 and its adjustable carriage, would, by their combined weight, produce more pressure between the tool and work than is allowable for best results in fine grinding and polishing. It is advisable, therefore, to support a portion of the combined weight of these parts by some calibrated means whereby the actual pressure of the tool on the work may be determined quickly and may be readjusted readily to any predetermined value at all times during operation of the machine. A simple and effective means for performing this function is shown in section in Fig. 1 of the drawings. A threaded stud 44, having rounded ends, the lower one of which is seated in a socket in the upper face 3 of base 1 and suitably keyed to prevent rotation, is provided with the adjusting hand wheel 45 within which is housed the thrust bearing 46. The hub of hand wheel 45 is tapped to fit on threaded stud 44. A free fitting cap 47 protects the thrust bearing from entrance of dirt and serves as a seat for sleeve 48 which fits snugly over a projection on cap 47, and is sweated thereon. A sleeve 49, freely slidable within sleeve 48, has a reduced bore at the upper end which fits freely over the head 50, of the preloading rod, passing through the hinge pin supporting the upper oscillating arm member 37. A coiled compression spring 51 fits with slight clearance within sleeve 49 and extends downwardly through sleeve 48, fitting with slight clearance around the upper unthreaded end of threaded stud 44 and seating, at its lower end against cap 47. Compression spring 51 is calibrated for pressure at various degrees of compression, and the outside of sleeve 49 is graduated in pounds to correspond with the calibration of spring 51. Pressures are read against the scale on sleeve 49 at the upper end of sleeve 48. By screwing hand wheel 45 upward on threaded stud 44, sleeve 48 is moved further up on sleeve 49, spring 51 is compressed to a greater degree, and the scale on sleeve 49 indicates a higher pressure, which means more lift on the tool supporting structures, and less pressure between the faces of the work and tool. Sleeve 49 may carry a reverse scale which will read directly the pressure in pounds exerted by the tool upon the work. More pressure on the abrading surfaces may be had by simply turning hand wheel 45 to move downwardly on threaded stud 44. The entire spring mechanism may be removed quickly for calibrating or other purpose by simply prying end of stud 44 out of its seat in the base 1.

The mechanism (Figs. 5 and 6) for actuating my device consists essentially of a pair of crank means associated with the hinge pin supporting carriages and arranged to operate the oscillating arm members, a vertical drive shaft for operating these crank means, a pulley shaft, a main gear box at the base of the vertical drive shaft and gearing connecting these shafts. Within the main gear box a series of gears, driven by the pulley shaft, are provided for the purpose of rotating the work and tool spindles at various selected speeds and in the same or in opposite directions. Driving connection between this series of gears and the worms meshing with worm gears on the work and tool spindles is provided by a pair of flexible shafts.

Fig. 6 showing a top view of oscillating arm member 8 partly in section, indicates a large cored hole 52 within the box frame structure joining the work spindle cylindrical housing 9 and the hinge pin cylindrical housing 23. Within cored hole 52 is a boss 53 integral with the box frame structure and boss 53 is bored and faced to receive key rod 54. An integral flange 55 on key rod 54 abuts against one face of boss 53. A control handle 56 having integral bored sleeve 56a fits over key rod 54 and is secured thereto in such position that the end of sleeve 56a contacts the opposite face of boss 53. Beyond integral flange 55, key rod 54 is of the same diameter as it is within boss 53 and at its end is integral key head 57 of the same outside diameter as flange 55 but it is cut down on two opposite sides to the size of the key rod. The control handle 56 is pinned to the key rod in such angular position that key head 57 is in alignment with the control handle. A hinge bracket 58, comprising a triangular box structure and two pairs of integral aligned bosses 59 and 60 positioned at opposite corners, is supported on oscillating arm member 8 by hinge pin 61 which passes through bosses 59 and a pair of bosses 62 in alignment therewith and integral with oscillating arm member 8. A boss 63 on hinge bracket 58 abuts against one side of flange 55 on key rod 54 and a boss 64 opposite to boss 63 serves as a seat for key head 57. The bore through bosses 63 and 64 is elongated vertically to pass key head 57 when control handle 56 stands vertically. When the control handle is turned to the horizontal position, key head 57 locks hinge bracket 58 securely to oscillating arm member 8.

A bracket 65 (Fig. 6) integral with end member 28 of the adjustable carriage supporting hinge pin 24, is provided with a vertical face against which is bolted crank mechanism supporting bracket 66. In a vertical bore in bracket 66, having its axis on the center line of the machine, is seated cylindrical housing 67 (Fig. 5) within which, in aligned bores, are seated ball bearings 68 and 69. The upper end of cylindrical housing 67 is enlarged to form the gear box 70 containing crank shaft gear 71 and its driving gear 72. Crank shaft 73, mounted in ball bearings 68 and 69, has ends of reduced diameter, the lower end projecting through ball bearing 68 is threaded to fit lock nut 74, and the upper end is press fitted and pinned into crank disc 75. The lower face of crank disc 75 is provided with a hub 76 forming a seat for crank shaft gear 71, which is further secured to the crank disc by suitable screws (not shown). The upper face of crank disc 75 is machined to mount the adjustable crank pin as follows: A V-slide is undercut across one side and parallel thereto is formed a square shoulder. Against this square shoulder abuts clamping plate 77 having a beveled surface, which, when the clamping plate is in position on crank disc 75, forms a V-slide parallel to the one cut directly into the crank disc. These V-slides are equally spaced from the axis of crank disc 75. Clamping plate 77 is secured to crank disc 75 by screws 78 (Fig. 6). A crank pin mount 79 wherein crank pin 80 is press fitted securely, is machined to fit within the V-slides so that it is easily adjustable along the slides when screws 78 are loosened, but is locked securely in any position by tightening these screws. Crank disc 75 has a scale engraved along one edge of the V-groove and crank pin mount 79 carries an arrow reading against this scale and indicating the throw of the crank for various settings of the crank pin mount. Driving gear 72 is provided with hubs on both sides and with two diametrically opposite keyways within which are securely fastened the keys 81. The gear 72 and the keys fastened therein are a free sliding fit on vertical shaft 82 and within the keyways therein so the gear may slide freely up and down the shaft as the sliding carriage supporting hinge pin 24 is variously positioned upward and downward along frame studs 4. The hubs of gear 72 are journaled in gear box cover 83 and in a bearing plug 84 fitted in a bore in gear box 70 and secured therein by suitable screws (not shown). A screw cover plate 85 closes the bottom end of cylindrical housing 67.

Crank pin 80 (Fig. 7) projects through a bore, with slight clearance, in bearing housing 86 at one end of connecting rod 87. A bearing retainer cap 88 held in position by suitable screws (Fig. 6) secures ball bearing 89 within housing 86. A portion 90 of somewhat smaller diameter on crank pin 80 is press fitted in ball bearing 89 and projects through a clearance hole in bearing retainer cap 88. The upper end of the crank pin is capped with disc 91 which is held in position on the crank pin by two screws 92. The opposite end of connecting rod 87 is provided with a bearing housing, a bearing retainer cap, and a ball bearing like those just described. A pin 93 (Fig. 6) is press fitted in the aligned bores in bosses 60, integral with hinge bracket 58, and through the ball bearing in this end of connecting rod 87. Hardened steel washers 94 (Fig. 5) are inserted between the ends of bosses 60 and the connecting rod to center this end of the connecting rod in hinge bracket 58 and to eliminate wear at these points.

The crank operating mechanism, connecting rod, hinge bracket and locking means just described as being associated with oscillating arm member 8 is duplicated for oscillating arm member 37 (Fig. 5) which as previously described, is mounted in inverted position on the opposite side of the machine and supported in the frame structure on the upper portions of the second group of frame studs 4. The drive for this second crank operating mechanism is provided by extending shaft 82 upward through the upper gear box 95 which is in every respect a duplicate of gear box 70. The gears in gear box 95, however, are not duplicates of gears 71 and 72. For mechanical convenience the center distances between the crank shafts and driving shaft 82 are made alike hence the sums of the number of teeth on the pairs of gears in gear boxes 70 and 95 are equal. A satisfactory progressive phase difference between the upper and lower cranks is obtained when the crank shaft gear in gear box 95 has one more tooth than crank shaft gear 71, when the driving gear in gear box 95 has one less tooth than driving gear 72 and when the sum of the number of teeth on gears 71 and 72 is an odd number. The reasons for the particular gear ratios in the crank operating drives is explained fully hereinafter.

A bracket 96 (Figs. 5 and 6) bolted to the base 1 projects rearwardly from the machine and supports the main gear box 97. Ball bearings 98 and 99 seated in recesses in opposite ends of gear box 97, are held in place by suitable retainer caps 100 and 101 respectively, which are fastened to the gear box by suitable screws. Pulley shaft 102 is journaled in ball bearings 98 and 99 and has fast mounted on it the helical gear 103 which meshes with helical gear 104 fast mounted on the vertical drive shaft 82. Vertical drive shaft 82 is journaled in bearing bushings 105 and 106 (Fig. 5) which are press fitted into gear box 97 and gear box cover 107 respectively, and bear against the bottom and top surfaces of helical gear 104 to take the end thrust on shaft 82. A helical gear 108 (Fig. 6) also fast mounted on pulley shaft 102 meshes with helical gear 109, the latter being fast mounted on shaft 110. Shaft 110 is journaled in bearing bushings mounted in the gear box 97 and in gear box cover 111, and projects upward above the gear box cover sufficiently to allow for attachment of one end of a flexible shaft. Gears 112, 113, and 114, all helical and of the same diameter and pitch are fast mounted on shafts just like shaft 110 which are journaled in like manner. Gears 112 and 113 mesh with gear 109 and consequently both turn in the same direction while gear 114, meshing with gear 113 turns in the opposite direction. A second series of helical gears 115, 116, 117, of slightly larger diameter than gears 112, 113, 114, are also arranged to provide flexible shaft connections for drives in the same or in opposite directions. A pair of helical gears 118 and 119 of somewhat larger diameter than gears 115, 116, 117, are arranged to provide flexible shaft drives at still lower speed and in opposite directions. Flexible drive shafts 120 and 121 (Figs. 1 and 2) connected at one end respectively to the shaft whereon worm 40 is fixed and to a shaft whereon an identical worm driving worm gear 19 is fixed, may be connected at their other ends to any two of the series of 9 shafts projecting upward from the top of gear box 97. By simply shifting shaft connections at the gear box the tool 38 and the chuck 22 may be rotated at various relative speeds in the same or in opposite directions. A pulley 122 mounted on pulley shaft 102 drives all the moving mechanism.

The sequence of operations to be followed in using my optical flat generating machine is as follows: The linkages through which lower oscillating arm member 8 and upper oscillating arm member 37 are driven by their respective operating cranks, are released, by the means provided (control handles 56), so members 8 and 37 may be swung apart to permit mounting of the chuck 22, carrying the work to be surfaced, and the tool 38, without interference. The contact seats on the chuck and tool and the mating surfaces on their respective spindles are cleaned thoroughly so that both chuck and tool may seat square to the axis of its respective spindle when screwed home. Adjusting hand wheel 45 is turned till the pressure exerted by compression spring 51 is sufficient to lift tool 38 above the upper face of work 21 on chuck 22. Abrading material is spread over the surface of the work with a brush and the surface is sprayed with an atomizer to bring the abrading mixture to the proper consistency.

Then the work and tool are swung toward each other into overlapping engagement as far as they will go and at this position the oscillating drive mechanism may be again locked in operative engagement with the oscillating arm members. The proper pressure to be exerted by the tool upon the work, which has been previously determined, is obtained by adjusting hand wheel 45 until scale reading on sleeve 49 indicates the correct figure.

The motor is then switched on and the mechanism is allowed to run for a sufficient period to use up the abrading material, but not long enough to allow the surface of the work to show any signs of becoming dry. In some cases, it may be found advisable to spray water on the surface of the work as it becomes partially exposed while the machine is operating. The motor is turned off, the oscillating arm member drive mechanisms are released and the work and tool are swung apart to permit washing of the work and tool surfaces and inspection of the work surface. If further abrading is necessary the cycle is repeated.

When the operation of fine grinding has been carried to completion and it is desired to polish the work without removal from the machine, the grinding tool is removed and replaced by a suitable pitch polisher. After application of the polishing material to the surface of the work and adjustment of the pressure of the polisher upon the work, the same sequence of operations as used in grinding is repeated.

The basic movement producing the abrading action in my device is the resultant of combining two simple harmonic motions substantially at right angles, the harmonic motions being slightly different in frequency to provide a continuous progressive phase shift. Such a movement provides automatically a varied path of the work over the tool, the path varying progressively from a straight line, clockwise, through elipses to a circle and through elipses to a straight line at right angles to the initial straight line and thence, counterclockwise, through elipses to a circle and through elipses back to the initial straight line. At this stage of operation the path is followed again in a clockwise direction and the above sequence is repeated as long as the machine is allowed to operate. To further vary the relative movement between work and tool, I have rotated positively both work and tool at slow speed, either in opposite directions or in the same direction but at slightly different speeds. The rotative speeds, for fine grinding and polishing, are so arranged that in no event will the abrading action due to rotation of the members exceed ten percent of the abrading action produced by the oscillating movement. Provision is made for changing both the direction and rate of rotation of the work and tool spindles to accommodate the machine quickly for either grinding or polishing any size work from the smallest piece to the largest within the capacity of the machine.

It will be observed from Fig. 2 that the drawings illustrate a mechanism organized so that the oscillating arm members 8 and 37 stand at 90 degrees to each other when the work and tool spindle axes are in exact alignment. When $\alpha$ equals 90 degrees, as illustrated, the arcs A—A and B—B, through which the axes of work and tool spindles respectively swing, intersect at right angles. It is to be noted, however, that arcs A—A and B—B are at right angles only at their point of intersection; as they swing inwardly toward the frame of the machine, the angle between the arcs grows progressively more acute; as they swing outwardly from their point of intersection, the angle grows progressively more obtuse. This angular variation, which is greatest when maximum stroke is imparted by the crank driving mechanism, serves effectively to further vary the pattern of motion between the work and tool. It may well be that in designing a mechanism to handle larger diameter chucks and tools it may prove advantageous to organize such device so $\alpha$ is somewhat greater than 90 degrees. In any event angle $\alpha$, the length of the oscillating arms and the length of stroke imparted by the cranks determine a further variation of the path of the tool over the surface of the work. In a given machine, only one of these three factors is adjustable; namely, the length of stroke imparted by the crank mechanisms. Any further advantage resulting from longer oscillating arms and/or other values of $\alpha$ can be had only by redesign of the machine.

The process of generating a surface involves the application to the task of certain fundamental geometrical principles. Any mechanism which is really capable of generating a particular surface must have built into its structure the means necessary to the performance of the motions required by the geometry of the surface. As stated hereinbefore, an optical flat generator must be capable of producing parallel motion of both the work and tool. Furthermore, any individual movement of either the work or the tool or both, such as rotations about an axis, must be performed without causing either work or tool to deviate from the plane wherein it is performing parallel motion. In the present structure this requirement is met fully if the hinge pins and the work and tool spindles are, and remain, parallel.

The distinguishing characteristic of a surface generating machine, as compared with the conventional lens grinder and polisher, is its inbuilt ability to form its own tools. For example, if two tools roughly turned are mounted in this machine, one on the tool spindle and one on the work spindle, and abrading material is applied and the machine is operated as hereinbefore described, the surfaces of these tools will ultimately become optically flat. It is to be noted that the tools do not become flat because of their initial shape when grinding began; they become optically flat because of the fact that they are caused to grind each other through movements constrained to take place in parallel planes. A mechanism capable of generating its own tools will, of necessity, regenerate the surface of the tool with every abrading stroke, hence the tool will never lose its flat abrading surface no matter how many work surfaces it produces.

The structures I have illustrated and described represent, for the present, the preferred form of my device. It is to be understood, however, that other mechanisms might be designed and constructed by those skilled in the art, for performing the essential functions of the present structures; namely, parallel movement of abrading members in parallel planes. The attached claims are drawn sufficiently broad to cover any and all devices of this character, and it is the intention that the claims be so interpreted.

Having thus fully described my device, what I claim is:

1. A mechanism for generating optical flats, comprising a rotatable work spindle, a tool spindle, a chuck squared to and centered on said work sprindle, means for moving simultaneously each of said spindles transversely with respect to the path of the other, a tool squared to and centered on said tool spindle, and means adapted and arranged to constrain the relative movements of said spindles through space so that their axes will always remain parallel.

2. A mechanism for generating optical flats, comprising a rotatable work spindle, a tool spindle, a chuck squared to and centered on said work spindle, a tool squared to and centered on said tool spindle, means for rotating said work spindle, means for moving simultaneously each of said spindles transversely with respect to the path of the other, and means adapted and arranged to constrain the relative movements of said spindles through space so that their axes will always remain parallel.

3. A mechanism for generating optical flats, comprising a work spindle, a rotatable tool spindle, a chuck squared to and centered on said work spindle, a tool squared to and centered on said tool sprindle, means for rotating said tool spindle, means for moving simultaneously each of said spindles transversely with respect to the path of the other, and means adapted and arranged to constrain the relative movements of said spindles through space so that their axes will always remain parallel.

4. A mechanism for generating optical flats, comprising a rotatable work spindle, a rotatable tool spindle, a chuck squared to and centered on said work spindle, a tool squared to and centered on said tool spindle, means for rotating said work spindle, means for rotating said tool spindle, means for moving simultaneously each of said spindles transversely with respect to the path of the other, and means adapted and arranged to constrain the relative movements of said spindles through space so that their axes will always remain parallel.

5. A mechanism for generating optical flats, comprising a work spindle, a tool spindle, a chuck centered on and squared to said work spindle, a tool centered on and squared to said tool spindle, an oscillating arm member supporting said work spindle at one end and a hinge pin at the other end, said work spindle and said hinge pin having their axes parallel, a second oscillating arm member supporting said tool spindle at one end and a second hinge pin at the other end, said tool spindle and said second hinge pin having their axes parallel, a frame structure for supporting said hinge pins in parallel positions, and means for oscillating said oscillating arm members.

6. In a mechanism for generating optical flats, a frame structure comprising a base, a top frame member and two groups of multiple spacer studs standing parallel and having their bottom ends fixed in said base and their top ends fixed in said top frame member after the manner of a clock frame structure, and a pair of adjustably mounted carriages, one carriage being mounted on one group of said multiple spacer studs and the second carriage on the other group, said carriages each comprising two end members and multiple spacer sleeves assembled after the manner of a clock frame structure, said carriages being adapted and arranged to journal a pair of hinge pins in parallel.

7. In a mechanism for generating optical flats, a frame structure comprising a base, a top frame member and two groups of multiple spacer studs standing parallel and fixed at their ends in said base and said top frame member, a pair of adjustably mounted carriages slidable on said multiple spacer studs, a crank operating mechanism mounted on each of said carriages, hinge pin bearings mounted on said carriages adapted and arranged to support a pair of hinge pins in parallel, a pair of hinge pins, an oscillating arm member supported from each of said hinge pins, a work supporting means at the free end of one of said oscillating arm members, a tool supporting means at the free end of the other of said oscillating arm members, and a pair of connecting rods between said crank operating mechanisms and said oscillating arm members adapted and arranged to swing said oscillating arm members about the axes of said hinge pins.

8. In a mechanism for generating optical flats, a pair of adjustably mounted opposed carriages, a crank operating mechanism supported on each of said carriages, hinge pin bearings mounted on each of said carriages adapted and arranged to support a hinge pin with its axis parallel to the direction in which said carriages are adjustable, hinge pins journaled in said bearings, an oscillating arm member supported from each of said hinge pins, a linkage carried on each of said said oscillating arm members, connecting rods between said crank operating mechanisms and said linkages, and locking and release means whereby said oscillating arm members may be operatively connected with said crank operating mechanisms or quickly released at will to permit said oscillating arm members to be swung apart for inspection of work.

9. An optical flat generating machine, comprising a pair of rotatable spindles, a tool mounted on each of said spindles, means for so constraining the movements of said spindles through space as to cause their axes to remain parallel always, and means adapted and arranged to actuate simultaneously said spindles to perform varying patterns of transverse movements each with respect to the path of the other for the purpose of generating optical flat surfaces on each of said tools.

10. An optical flat generating machine, comprising a pair of rotatable spindles, a tool mounted on one of said spindles having a generated flat abrading surface, a chuck mounted on the second spindle, means for so constraining the movements of said spindles through space as to cause their axes to remain parallel always, and means adapted and arranged to actuate simultaneously said tool and said chuck to perform varying patterns of transverse movements each with respect to the path of the other for the purpose of generating an optical flat surface on work mounted on said chuck while continuously regenerating and thereby maintaining an optical flat surface on said tool.

11. In an optical flat generating machine, a pair of spindles, a pair of hinge pins, a pair of oscillating arm members, parallel bores in the ends of said arm members wherein one spindle and one hinge pin are mounted, a frame structure adapted and arranged to support said hinge pins in spaced parallel positions, crank means, connecting rods operatively connecting said crank means with each of said oscillating arm members, and driving means adapted and arranged to oscillate said arm members at slightly different frequencies.

12. In an optical flat generating machine, a pair of spindles, a pair of hinge pins, a pair of oscillating arm members, parallel bores in the ends of said arm members wherein one spindle is rotatably mounted and one hinge pin is hingedly mounted, a frame structure adapted and arranged to support said hinge pins in spaced parallel positions, crank means, connecting rods operatively connecting said crank means with each of said oscillating arm members, and driving means adapted and arranged to oscillate said arm members and rotate said spindles.

13. In an optical flat generating machine, a pair of spindles, a pair of hinge pins, a pair of oscillating arm members, parallel bores in the ends of said arm members wherein one spindle is rotatably mounted and one hinge pin is fixedly mounted, a pair of adjustably mounted hinge pin carriages, bearings in said carriages adapted and arranged to hingedly support said hinge pins with their axes parallel to the direction in which said carriages are adjustable, a frame structure adapted and arranged to support slidably said adjustably mounted hinge pin carriages, and means for variously positioning said hinge pin carriages within said frame structure.

14. In an optical flat generating machine, driving means comprising a pair of opposed oscillating arms hingedly mounted to swing on parallel axes, a pair of coacting spindles rotatably mounted one on the swinging end of each of said opposed oscillating arms, a tool mounted on one end of one of said spindles, a work piece mounted on the opposed end of the other of said spindles, gear operated crank means adapted and arranged to oscillate said arms simultaneously at slightly different frequencies, means for rotating said spindles at selected rates of rotation in the same or in opposite directions, and means adapted and arranged to actuate all parts of said driving means from one pulley shaft.

15. An optical flat generator wherein the work and tool are constrained to perform a variety of motion patterns, one with respect to the other, in parallel planes, comprising a pair of hinge pins supported in spaced parallel relation, a pair of oscillating arms, a pair of spindles, said arms having bores at opposite ends standing parallel to each other and at right angles to the long dimension of said arms, said arms being swingably mounted on said hinge pins, fitting within one bore, and carrying in the opposite bore one of said spindles, the length of said arms and the spacing of said hinge pins being such as to cause said arms to stand substantially at right angles when said arms are swung so that the axis of one of said spindles coincides with the extended axis of the other of said spindles.

16. In an optical flat generator, an adjustable carriage adapted and arranged to support a hinge pin, multiple parallel studs whereon said carriage may slide, said carriage comprising a pair of end members of antifriction material bored precisely to fit with minimum clearance around said multiple parallel studs and also provided with precision bores wherein said hinge pin is supported, and multiple sleeves adapted and arranged to enclose said multiple parallel studs and maintain said end members in exactly parallel spaced relationship.

17. An optical flat generator comprising, a pair of oscillating arms, a pair of hinge pins adjustably supported in parallel spaced relationship for axial displacement, a work spindle, a tool spindle and a supporting frame, one of said oscillating arms being hinged at one end on one of said hinge pins and supporting rotatably at its other end said work spindle parallel to said hinge pin, the second of said oscillating arms being hinged at one end on the second of said hinge pins and supporting rotatably at its other end said tool spindle parallel to said second hinge pin, said supporting frame being adapted and arranged to so space said hinge pins that angle a (Fig. 2) will be greater than 90 degrees for the purpose of further varying the patterns of the path of travel of the tool over the surface of the work.

18. In an optical flat generator, the combination of a pair of oscillating arms, one supporting a work spindle, the other a tool spindle in parallel relationship, a pair of parallel hinge pins whereon said oscillating arms may swing, a pair of adjustably mounted carriages wherein said hinge pins are journaled, a frame structure wherein said carriages may slide without disturbing the parallel relationship of said work and tool spindles, means for adjusting the elevation within said frame structure of the carriage supporting said work spindle, means adapted and arranged to indicate the pressure of the tool carried on said tool spindle upon the work carried on said work spindle, and means for adjusting by small increments the pressure of the tool upon the work.

19. In a device of the character specified, multiple means for varying the pattern of the path of travel of the tool over the surface of the work, said means including a pair of gear driven cranks, a pair of crank operated mechanisms, a rotatable tool spindle carried on one of said crank operated mechanisms, a rotatable work spindle carried on the other of said crank operated mechanisms, and a series of dissimilar gear trains arranged for operating selectively said rotatable spindles, the gear ratios in the gears driving said cranks being such as to produce a progressive phase shift between said cranks, said dissimilar gear trains and the gear ratios therein being adapted and arranged to provide reversal of direction and increments of speed difference in the rotation of said spindles.

20. In a device of the character specified, multiple means for varying the pattern of the path of travel of the tool over the surface of the work, said means including a pair of gear driven cranks, a pair of crank operated mechanisms, independently adjustable crank throws, a rotatable tool spindle carried on one of said crank operated mechanisms, a rotatable work spindle carried on the other of said crank operated mechanisms, and a series of dissimilar gear trains arranged for operating selectively said rotatable spindles, the gear ratios in the gears driving said cranks being such as to produce a progressive phase shift between said cranks, said dissimilar gear trains and the gear ratios therein being adapted and arranged to provide reversal of direction and increments of speed difference in the rotation of said spindles.

21. In an optical flat generator having a pair of oscillating arms pivoted on parallel hinge pins and adapted and arranged to support rotatably a tool and a work supporting chuck in parallel relationship at their swinging ends, means for varying the pattern of the path of travel of the tool over the surface of the work comprising independently adjustable crank throws in the oscillating arm operating mechanism.

22. In an optical flat generator having a pair of oscillating arms pivoted on parallel hinge pins and adapted and arranged to support rotatably a tool and a work supporting chuck in parallel relationship at their swinging ends, means for providing a different pattern of the path of travel of the tool over the surface of the work, said means comprising a mechanism so organized with respect to oscillating arm length and hinge pin location as to make the angle a (Fig. 2) other than 90 degrees.

ARTHUR J. HOLMAN.